United States Patent [19]

Fletcher et al.

[11] 4,282,665
[45] Aug. 11, 1981

[54] EXCAVATOR TOOTH ASSEMBLY

[75] Inventors: Robert N. Fletcher, Marion; Damon N. Christian, Cardington, both of Ohio

[73] Assignee: Dresser Industries, Inc., Dallas, Tex.

[21] Appl. No.: 118,971

[22] Filed: Feb. 6, 1980

[51] Int. Cl.$^3$ .......................... B25G 3/36; B25G 3/00; F16B 3/00
[52] U.S. Cl. .................................. 37/142 A; 37/195; 299/92; 403/374; 403/318
[58] Field of Search .................. 37/142 R, 142 A, 195; 403/315–318, 409, 374; 299/92

[56] References Cited

U.S. PATENT DOCUMENTS

| | | | |
|---|---|---|---|
| 2,483,032 | 9/1949 | Baer | 37/142 A |
| 2,765,140 | 10/1956 | Gerlach | 403/374 X |
| 2,870,667 | 1/1959 | Murtaugh | 37/142 A |
| 2,927,386 | 3/1960 | Day | 37/142 A |
| 2,927,387 | 3/1960 | Drover | 37/142 A |
| 3,126,654 | 3/1964 | Eyolfson et al. | 37/142 A |
| 3,722,932 | 3/1973 | Dougall | 37/142 A |
| 4,061,432 | 12/1977 | Hahn et al. | 37/142 R |
| 4,067,657 | 1/1978 | Kaarlela | 37/142 R X |
| 4,187,035 | 2/1980 | Colburn | 403/374 X |
| 4,213,257 | 7/1980 | Johansson et al. | 37/142 R |

FOREIGN PATENT DOCUMENTS

| | | | |
|---|---|---|---|
| 250500 | 5/1963 | Australia | 37/142 R |
| 696126 | 10/1964 | Canada | 37/142 R |
| 698733 | 11/1964 | Canada | 37/142 R |
| 808070 | 3/1969 | Canada | 37/142 R |
| 2032980 | 5/1980 | United Kingdom | 37/142 A |

Primary Examiner—E. H. Eickholt
Attorney, Agent, or Firm—Ward, Lalos, Leeds, Keegan & Lett

[57] ABSTRACT

An excavator tooth assembly mountable on a tooth support member of a dipper or bucket of an excavator, having an opening therethrough, generally comprising a tooth mounted on a tooth support member, having a pair of aligned openings registering with the tooth support opening to provide a pin receiving opening, a locking pin retainer disposed in the pin receiving opening, having a resilient pad engaging the tooth support member, a set of shims, each interposed between an end portion of the locking pin retainer and the tooth member, and a tapered locking pin inserted in the pin receiving opening and engaging the locking pin retainer and the tooth support member in wedging relation to positively secure the tooth member on the tooth support member.

33 Claims, 15 Drawing Figures

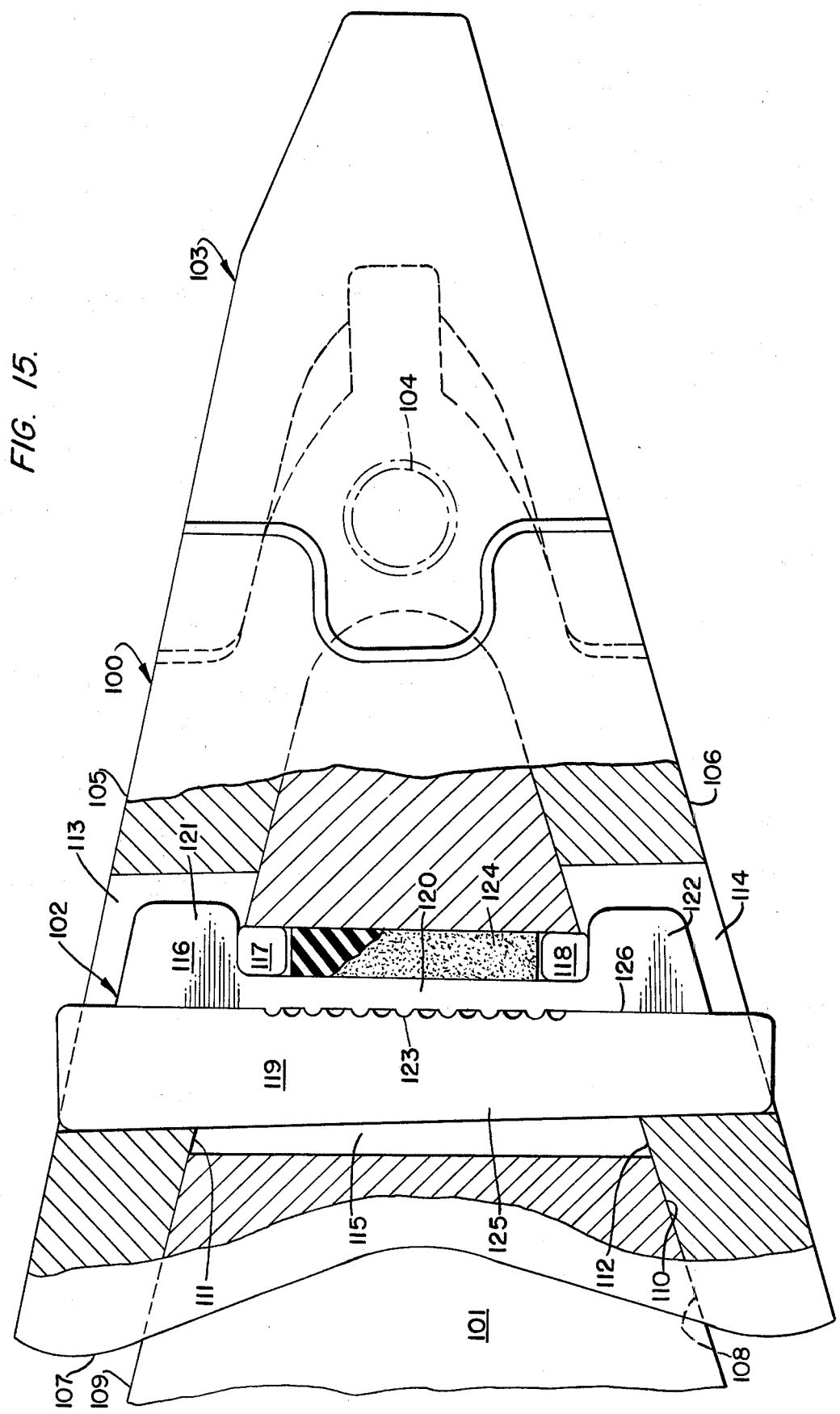

EXCAVATOR TOOTH ASSEMBLY

This invention relates to a tooth assembly and more particularly to a tooth assembly suitable for use in excavators such as draglines, mining shovels, loading shovels, wheel excavators, backhoes and the like.

In the prior art, the buckets and dippers of conventional types of excavators generally have been provided with tooth assemblies consisting of a tooth shank formed integrally with the bottom blade of the bucket or dipper, having a protruding portion provided with a pin receiving opening, a tooth mounted on the tooth shank having a socket for receiving the protruding portion of the tooth shank and a pair of aligned openings which register with the pin receiving opening in the protruding portion of the tooth shank when the tooth is mounted on the tooth shank, and a retainer pin inserted in the register openings of the tooth and tooth shank for securing the tooth to the tooth shank.

Many variations of the aforementioned type of tooth assembly have been developed, manufactured and used in the prior art. It has been found, however, that most of such assemblies have not been entirely satisfactory from the standpoint of both cost and performance. Often, due to the number and configuration of the components, the manufacturing costs are high and thus prohibitive. In other instances, because of design, the assembly and disassembly of the assemblies require an undue amount of time which increases the down time of the machine and, correspondingly, the operating costs of the machine. Furthermore, it has been found that the unsatisfactory design of such assemblies ultimately results in undue wear of the tooth members and premature tooth breakage. It thus has been found to be desirable to provide an improved excavator tooth assembly.

Accordingly, it is the principal object of the present invention to provide an improved tooth assembly.

Another object of this invention is to provide an improved tooth assembly suitable for use with excavators such as draglines, mining shovels, loading shovels, wheel excavators, backhoes and the like.

A further object of the invention is to provide a tooth assembly for an excavator, generally utilizing a tooth shank mounted on the blade of a bucket or dipper of the excavator, a tooth mounted on the tooth shank and a pin arrangement for securing the tooth member to the tooth shank in which the tooth is prevented from becoming loose on the tooth shank thus causing premature wear or breakage.

A still further object of the present invention is to provide a tooth assembly for an excavator generally utilizing a tooth shank mounted on the blade portion of a bucket or dipper of the excavator, a tooth member mounted on the tooth shank and a pin arrangement for securing the tooth member to the tooth shank in which dimensional variations in pin receiving openings in the tooth shank and tooth member can be tolerated and readily accommodated in providing a tight and secure mounting of the tooth member on the tooth shank.

Another object of the invention is to provide an improved excavator tooth assembly generally utilizing a tooth shank mounted on the blade portion of the bucket or dipper of the excavator, a tooth member mounted on the tooth shank and a pin for locking the tooth member on the tooth shank in which the locking pin is simple in design, can readily accomodate cast tooth shanks and tooth assemblies having pin receiving openings of variable dimensions and is not required to be excessively long thereby necessitating trimming of the ends thereof after insertion.

A further object of the present invention is to provide an improved pin assembly for mounting a tooth on the tooth shank of a working implement such as a bucket or dipper of an excavator.

A still further object of the present invention is to provide an improved method of mounting a tooth member on a tooth shank mounted on a work implement such as a bucket or dipper of an excavator.

Other objects of the invention will become more apparent to those persons having ordinary skill in the art to which the present invention pertains from the following description taken in conjunction with the accompanying drawings wherein:

FIG. 3 is an enlarged, cross-sectional view taken along line 3—3 in FIG. 2;

FIG. 4 is a cross-sectional view taken along line 4—4 in FIG. 3;

FIG. 15 is a side elevational view of a further embodiment of the present invention.

Figure 1:
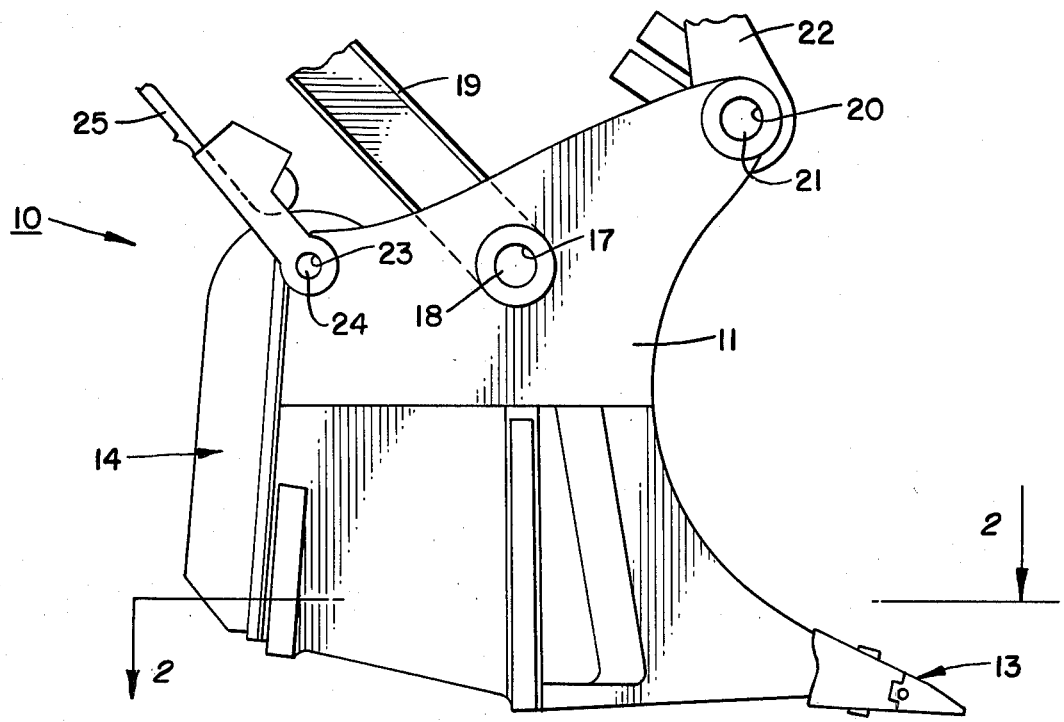
FIG. 1 is a side elevational view of a bucket for an excavator, utilizing an embodiment of the present invention.
Figure 2:
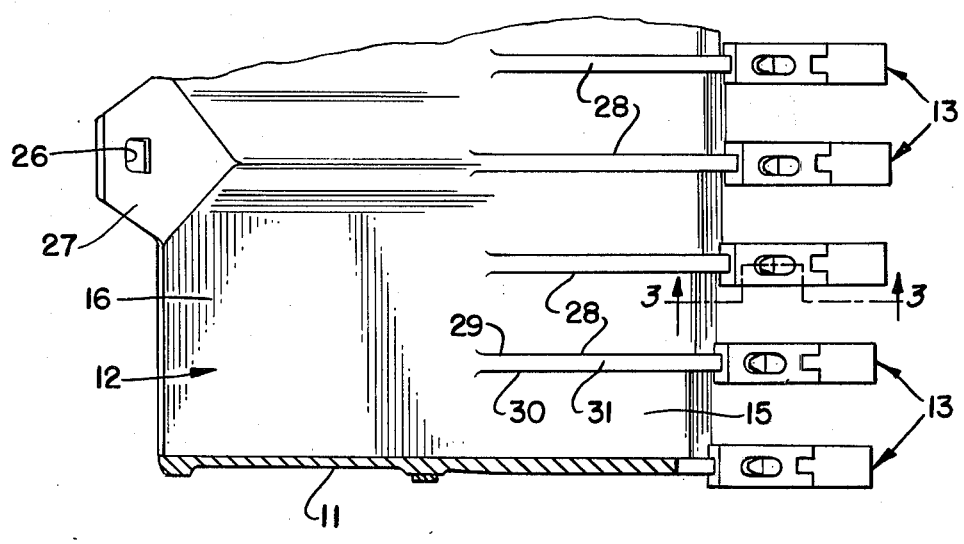
FIG. 2 is a cross-sectional view taken along the lines of 2—2 in FIG. 1, having a portion thereof broken away.
Figure 5:
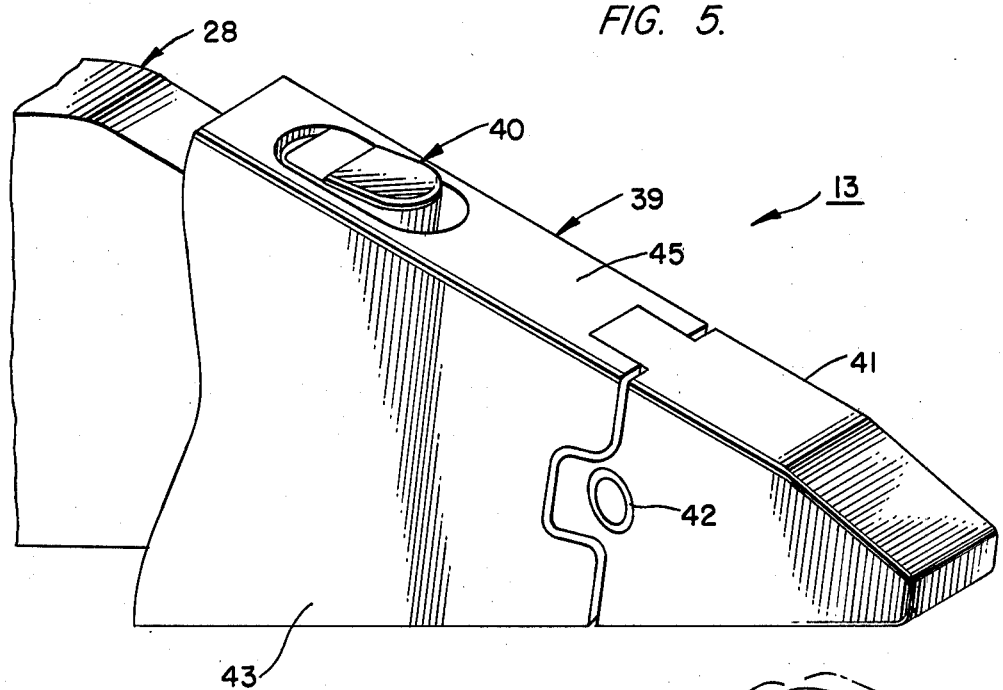
FIG. 5 is an enlarged, perspective view of the tooth assembly illustrated in FIGS. 1 through 4, embodying the present invention.

Referring to FIGS. 1 and 2, there is illustrated a dipper 10 including a pair of side walls 11, a bottom wall or blade 12 interconnecting the side walls to provide a material receiving channel, a plurality of tooth assemblies 13 mounted on the front lip of the bottom wall or blade and a door 14 pivotally connected to the upper ends of side walls 11. Bottom wall 12 is formed integrally with the lower portions of side walls 11 and includes a forwardly disposed lip portion 15 in an upwardly and rearwardly inclined, rearwardly disposed portion 16.

The dipper illustrated in FIGS. 1 and 2 is particularly adapted for use with the type of excavating machine shown and described in U.S. Pat. No. 3,648,863, and is provided with connecting pin openings in the upper ends of the side walls to accommodate the connection of the dipper to the front end of such type of machine. In particular, the upper intermediate portions of the side walls are provided with transversely aligned pin receiving openings 17 which are adapted to receive therein a pair of pins 18 for pivotally connecting the dipper to a dipper handle 19 of the excavating machine, the upper, forwardly disposed portions of the side walls are provided with a pair of transversely aligned pin receiving openings 20 which are adapted to receive a pair of pins 21 for connecting a hoist link 22 of the machine to the dipper, and the upwardly, rearwardly disposed portions of the side walls are provided with a pair of transversely aligned openings 23 which are adapted to receive a pair of pins 24 for securing the ends of a pair of pitch links 25 to the dipper. The dipper door is substantially of a conventional construction having the upper end thereof pivotally connected to the upper, rearwardly disposed portions of the side walls by means of a pair of transversely aligned pins and the side and bottom edges thereof engageable with the rearwardly disposed edges of the side walls and bottom wall to close the rear end of the channel formed by the side and bottom walls. The door further is provided with a mechanism including a releasable latch which is adapted to be received within an opening 26 disposed in a rearwardly projecting portion 27 forming substantially a continuation of bottom wall 12.

Figure 6:
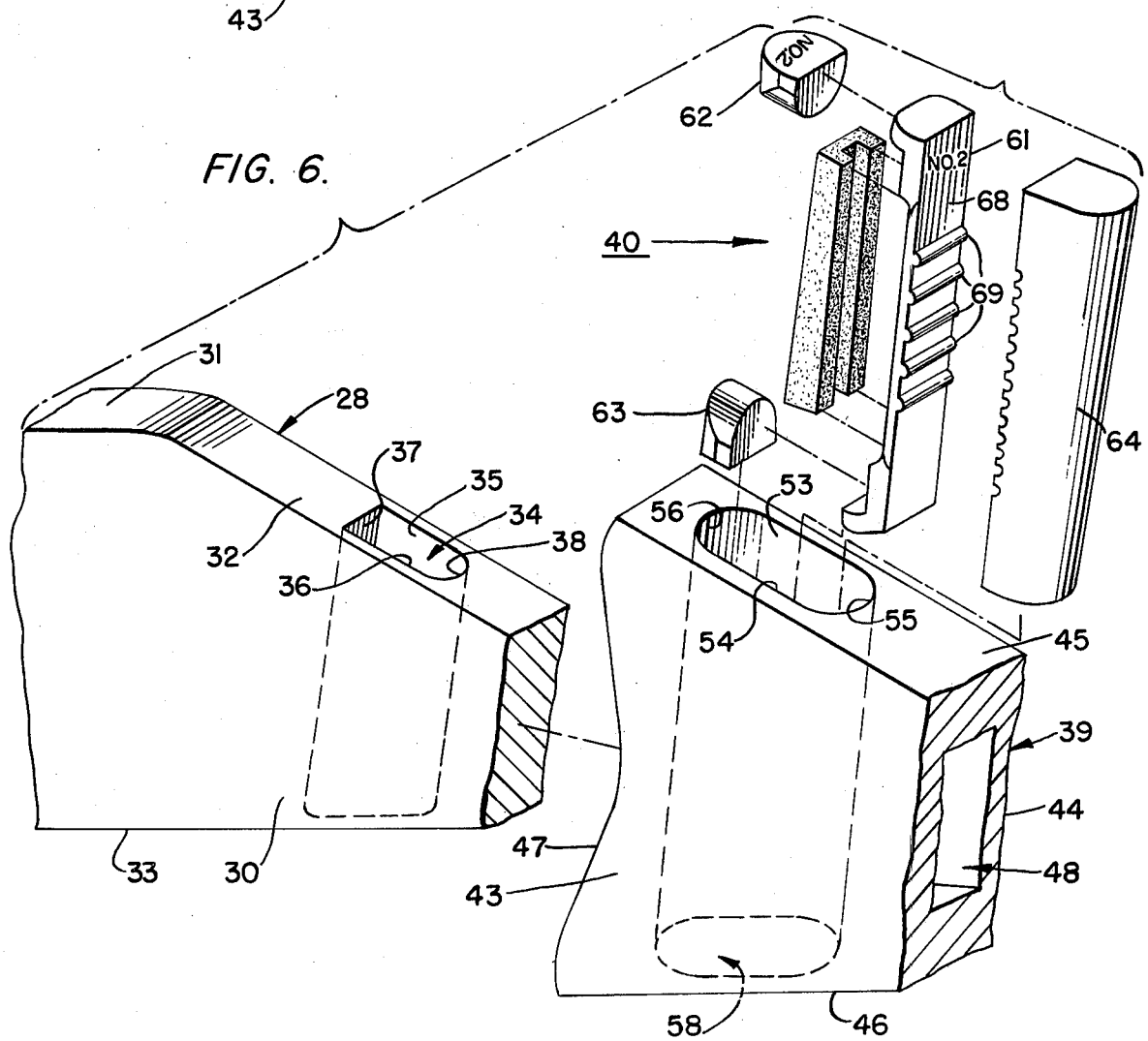
FIG. 6 is a perspective view of the tooth assembly shown in FIG. 5, illustrating the components thereof in exploded relation.

Formed integrally with lip portion 15 of the dipper bottom wall is a plurality of transversely spaced, longitudinally disposed tooth base members 28, having a forwardly disposed portion thereof projecting forwardly of the front edge of the bottom wall. As best seen in FIGS. 2 and 6, each of tooth base members 28 includes a pair of side surfaces 29 and 30 disposed substantially perpendicular to the forwardly disposed portion of the bottom wall, an upper edge 31 having a forwardly disposed, downwardly sloping portion 32 which merges into a curved front end of the tooth shank which in turn merges with a bottom edge 33. The forwardly projecting portion of each tooth base is provided with a pin receiving opening 34 having a pair of side walls 35 and 36, a rear wall 37 and a curved front wall 38.

Figures 3, 4:
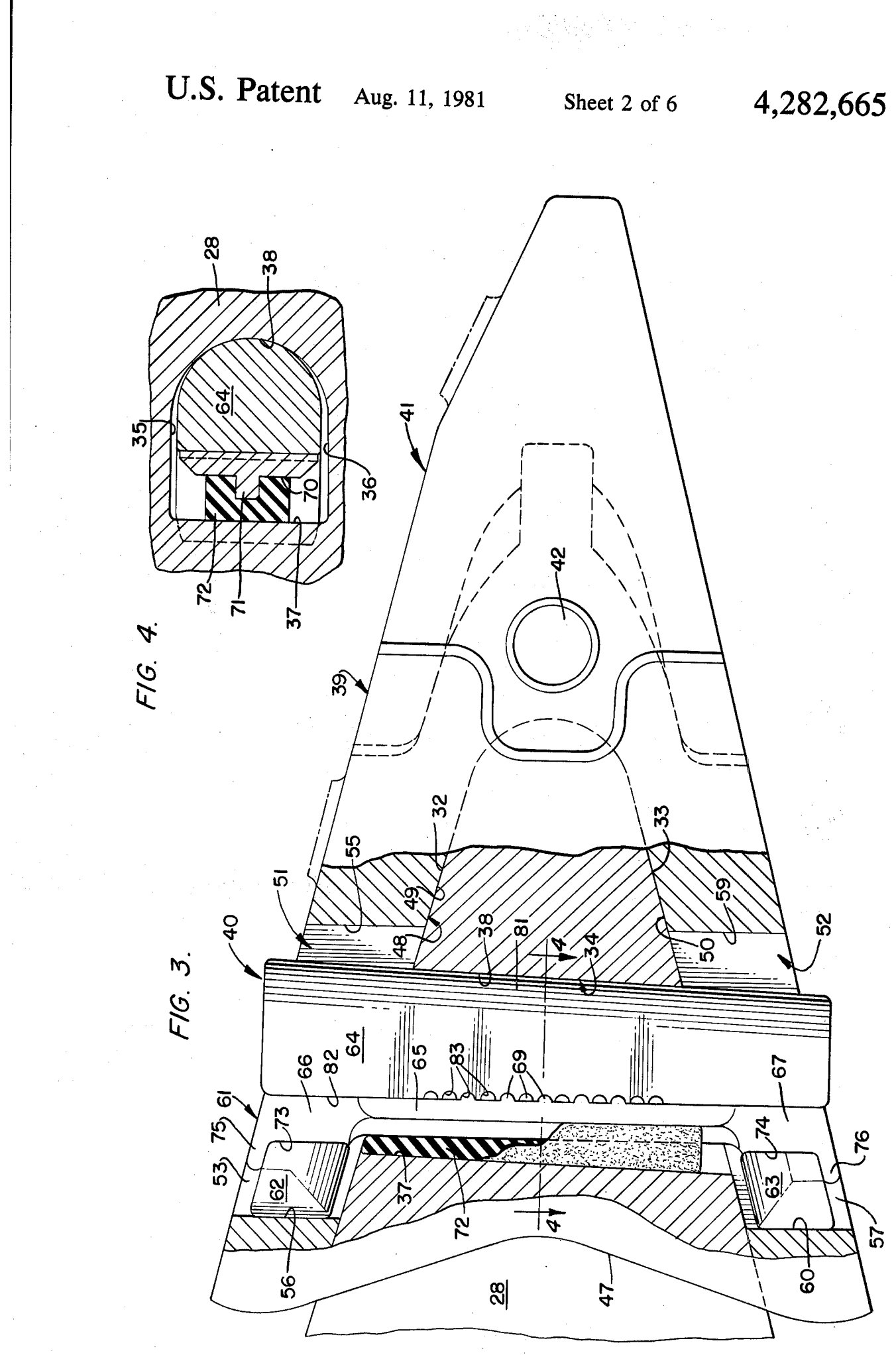
Figure 8:
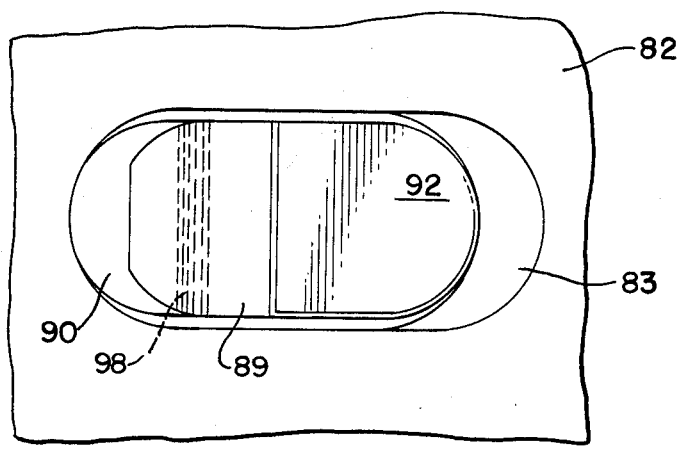
FIG. 8 is a cross-sectional view taken along line 8—8 in FIG. 7.

Each of tooth assemblies 13 consists of a tooth shank 39 mountable on the forwardly projecting end of a tooth base 28 and secured thereto by a retainer pin assembly 40, and a tooth point 41 mounted on the front of the tooth shank by means of a connecting pin 42. As best shown in FIGS. 3 through 6, tooth shank 39 includes a pair of side walls 43 and 44, a pair of converging upper and lower walls 45 and 46 and a rear end wall 47. As best seen in FIG. 3, rear wall 47 of the tooth shank is provided with a socket 48 for receiving the forwardly projecting end of a tooth base 28 when the tooth shank is mounted on the tooth base, having upper and lower converging walls 49 and 50 engaging converging walls 32 and 33 of the tooth base. The tooth shank furthermore is provided with a set of aligned openings 51 and 52 which are adapted to register with pin receiving opening 38 in the forwardly projecting portion of the tooth base, as best illustrated in FIG. 3. Each of openings 51 and 52 has a greater longitudinal dimension than the longitudinal dimension of pin receiving opening 34. Opening 51 is provided with a pair of side walls 53 and 54 spaced apart approximately the same distance as the spacing between walls 35 and 36 of pin receiving opening 34, and curved front and rear walls 55 and 56. Similarly, aligned opening 52 is provided with a pair of side walls 57 and 58 and curved front and rear walls 59 and 60. As best shown in FIG. 8, it will be noted that when the tooth shank is mounted on the tooth base, curved front walls 55 and 59 of openings 51 and 52 will be spaced forwardly of the curved front wall 38 of pin receiving opening 34, and rear end walls 56 of opening 51 and 60 of opening 52 will be spaced rearwardly of end wall 37 of pin opening 34.

Retainer pin assembly 40 consists of a locking pin retainer 61, a set of pairs of substantially identical shims 62 and 63 and a locking pin 64. Locking pin retainer 60 includes an intermediate body portion 65 and end portions 66 and 67. As best shown in FIGS. 4 and 6, the intermediate portion of retainer pin 61 is provided with a locking pin engaging surface 68 having a plurality of transversely disposed, longitudinally spaced ribs 69. The opposite surface 70 of the retainer is provided with a longitudinally disposed rib 71 on which there is mounted a resilient pad 72. As best shown in FIG. 3, the end portions of the retainer pin are provided with shim engaging surfaces 73 and 74 and shim retaining flanges 75 and 76, respectively.

Figure 9:
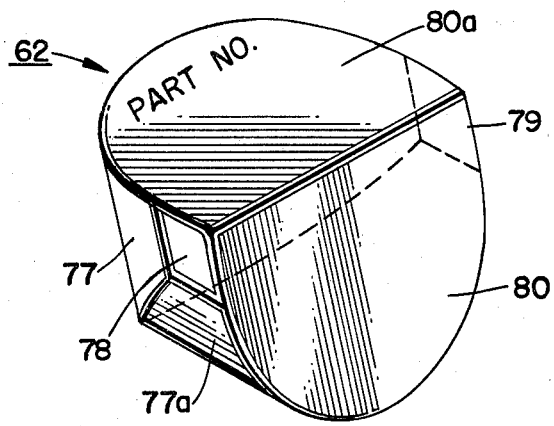
FIG. 9 is an enlarged, perspective view of a shim utilized in the invention.
Figure 10:
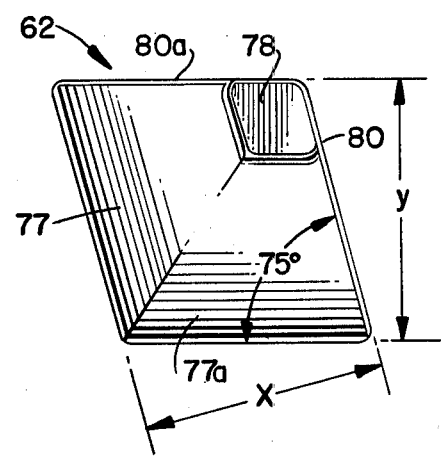
FIG. 10 is a side elevational view of the shim shown in FIG. 9.
Figure 11:
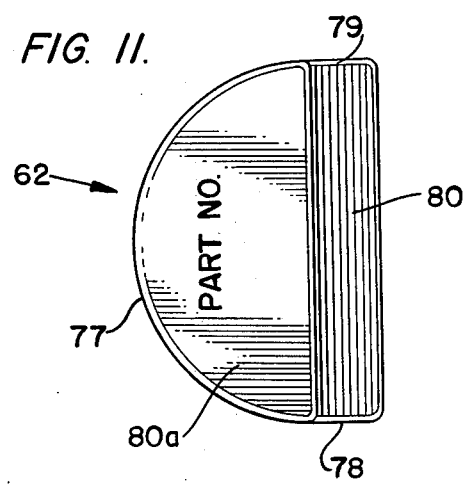
FIG. 11 is a top view of the shim shown in FIG. 9.
Figure 13:
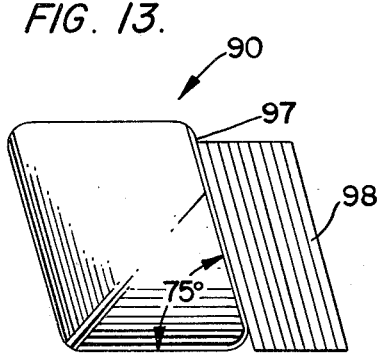
FIG. 13 is a side, elevational view of the shim shown in FIG. 12.

Referring to FIGS. 9 through 11, shim 62 will be noted as having a curved rear surface 77 engagable with curved surfaces 56 of opening 51 or 60 of opening 52, a set of side surfaces 78 and 79 engagable with the side walls of opening 51 or 52 and a sloping front wall 80 engagable with a surface 73 and 74 of the locking pin retainer when the tooth assembly is fully assembled. The shims are formed of any suitable metal having sufficient strength to effectively transmit the digging loads imparted on the tooth point and transmitted through the tooth shank and pin assembly to the base.

Locking pin 64 is tapered along its length and is provided with a curved front surface 81 engagable with curved front wall 38 of tooth base opening 34 and a rear surface 82 engagable with surface 68 of retainer 61, having serrations 83 for receiving the rib portions of the retainer when the pin assembly is fully assembled.

In the assembly of the tooth assembly as described, the tooth shank with the tooth point attached is first mounted on the tooth base so that the tooth base is received within socket 48 and aligned openings 51 and 52 register with pin receiving opening 34. The locking pin retainer is then inserted in the registered openings and positioned so that resilient pad 32 engages rear wall 37 of pin receiving opening 34. The upper and lower ends of the locking pin retainer are then tilted forwardly to permit the insertion of the upper and lower shim blocks. When the shim blocks are properly oriented into position and the locking pin retainer is returned to its position, the rear curved walls of the shim blocks will engage curved rear walls 56 and 60 of openings 51 and 52, the front planar surfaces 80 of the shim blocks will engage planar surfaces 73 and 74 of the locking pin retainer and retainer flanges 75 and 76 of the locking pin retainer will prevent the outward movement of the shim blocks. With the shim blocks and the locking pin retainer thus positioned, the tapered locking pin is inserted through opening 51 and driven with a hammer into tooth base opening 34 so that the locking pin engages the locking pin retainer and tooth base in wedging relation. After the locking pin has been driven into position, longitudinal displacement of the pin is restrained by the engagement of ribs 69 of the locking retainer with the serrations formed on the locking pin. To disassemble the pin assembly for removing the tooth shank, the locking pin is merely driven in the opposite direction to remove the pin and thus release the locking pin retainer and shims.

The tooth base, the tooth shank and tooth point normally are of cast constructions. Because of imprecise casting tolerances, the dimension between the front wall of tooth base opening 34 and the rear wall of aligned tooth shank openings 56 and 60 will vary accordingly. To compensate for such dimensional variations without having to resort to unduly long locking pins which would have to be driven into the registered openings until the components were sufficiently wedges in locking relation, the invention contemplates the use of a number of pairs of shim blocks of different thicknesses. Accordingly, if the locking pin is inserted into the register openings and does not sufficiently engage the tooth base and locking pin retainer in wedging relation to securely lock the tooth shank with the tooth base, the pin assembly may be disassembled and shims of greater thicknesses may be inserted to reduce the spacing between locking pin retainer wall 61 and tooth base opening wall 38. Such procedure can be repeated using shims of greater thicknesses until a set of proper thickness is installed which will permit the locking pin to be inserted and provide a sufficient wedging action to lock the tooth shank to the tooth base.

It is contemplated that each shim block will be designed so that it may be oriented in two different positions in the pin assembly to provide two different shim thicknesses. Referring to FIG. 10, it will be appreciated that the "y" dimension can be made fractionally larger than the "x" dimension. Accordingly, if shim 62 is installed in the assembly with surface 77 engaging curved surface 56 of opening 51 and planar surface 80 engages surface 73 of the locking pin retainer and the pin is too loose, the assembly may be disassembled and shim 62 can be reoriented so that curved surface 77a engages curved surface 56 of opening 51 and planar surface 80a engages surface 73 of the locking pin retainer to correspondingly reduce the dimension between locking pin engaging surface 68 of the locking pin retainer and surface 38 of the base opening 34. As an example, the "x" dimension of shim 62 can be on the order of 1.82 inches and the "y" dimension may be of the order of 1.91 inches. By reorienting the shim as described the shim thickness can be increased 0.09 inches to correspondingly decrease the dimension between surface 68 of the locking pin retainer and wall 38 of the tooth base opening a like amount. It further is contemplated that the other sets of blocks vary in thickness between 1.64 inches and 2.45 inches, in increments of 0.09 inches, for a typical application of the proposed invention to the bucket of a ten cubic yard mining shovel. The thickness of the shim blocks can be indicated on the shims to assist personnel in selecting the proper shim thicknesses during replacement of the assemblies.

Figure 7:
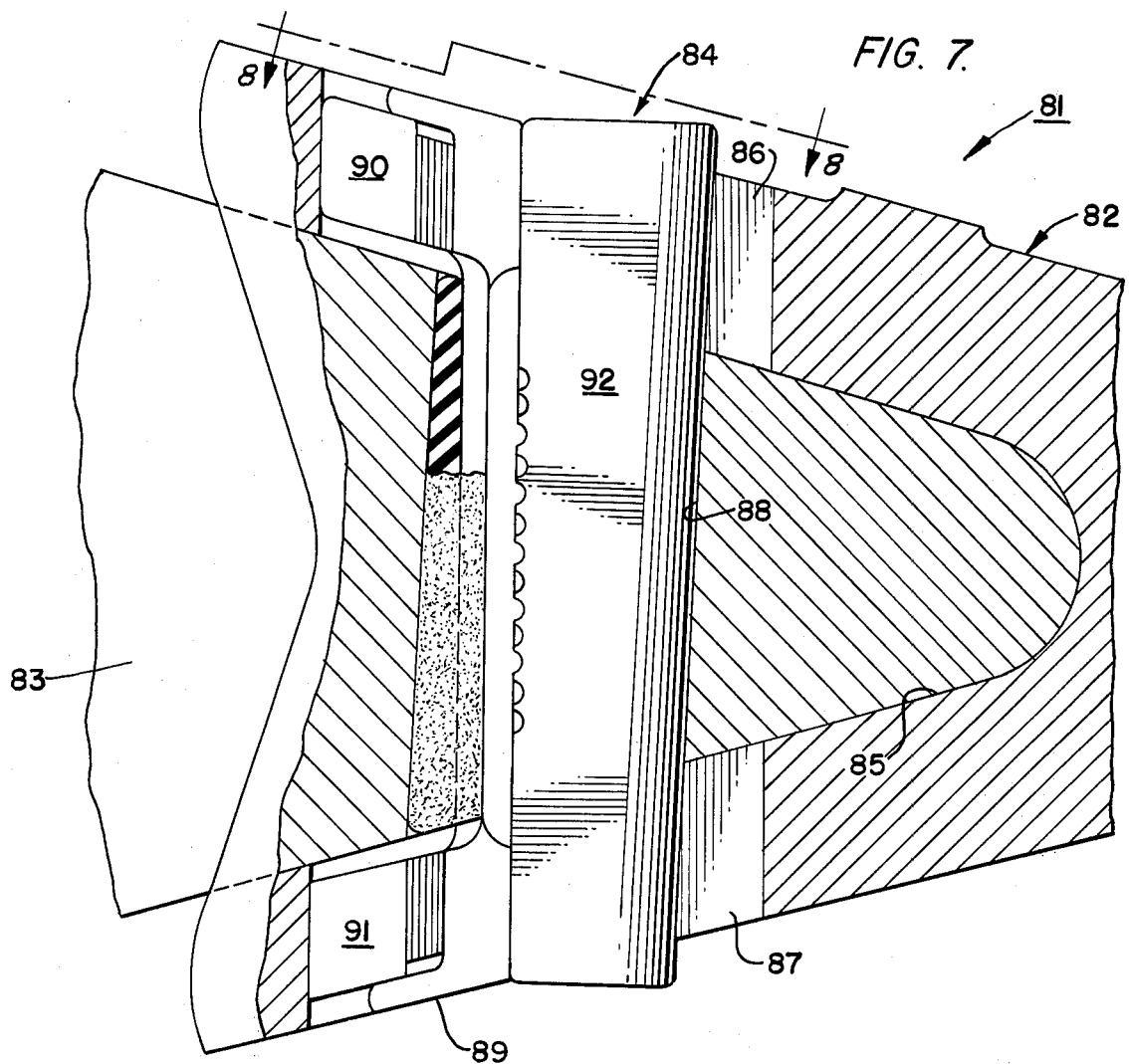
FIG. 7 is a view similar to the view shown in FIG. 3, illustrating another embodiment of the invention.

The embodiment shown in FIGS. 7 and 8 of the drawings is substantially similar to the embodiment shown and described in connection with FIGS. 1 through 7. The embodiment consists of a tooth assembly 81 including a tooth 82 mounted on a protruding portion of a tooth shank 83 rigidly mounted on the bottom wall or blade of an excavator dipper or bucket, and a retainer assembly 84. Tooth 82 is provided with a socket 85 which is adapted to receive the protruding end of tooth shank 83, and a set of aligned openings 86 and 87 which register with an opening 88 when tooth 82 is mounted on tooth shank 83. The retainer assembly consists of a locking pin retainer 89, a set of identical shims 90 and 91 and a locking pin 92. Locking pin retainer 89 and locking pin 92 are substantially similar in construction and function to locking pin retainer 61 and locking pin 64. Although shims as disclosed in FIGS. 9 through 11 may be utilized in the embodiment shown in FIGS. 7 and 8, alternate shim block constructions can be utilized as illustrated in FIG. 7.

Figure 12:
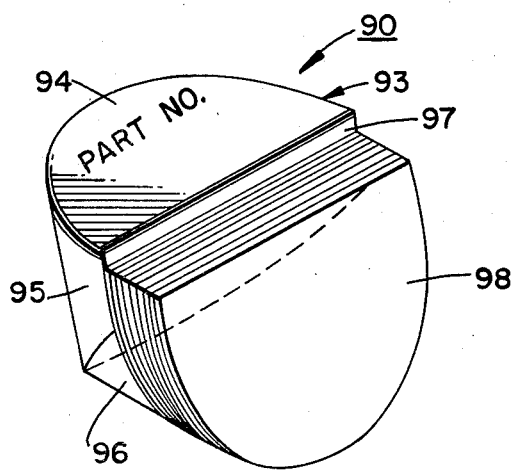
FIG. 12 is an enlarged, perspective view of an alternate shim which may be used with the invention.
Figure 14:
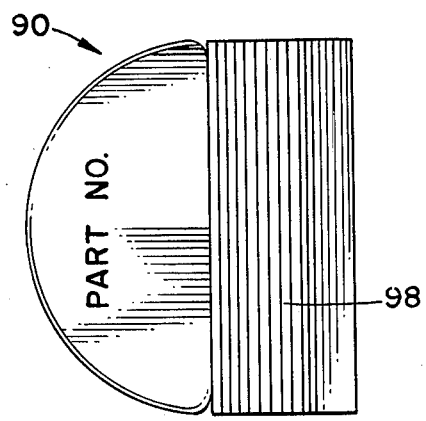
FIG. 14 is a top plan view of the shim shown in FIG. 12.

Referring to FIGS. 12 and 14, shim block 90 consists of a main body portion 93 having a top planar surface 94, a curved rear surface 95, a curved bottom surface 96, and a front planar surface 97 provided with a plurality of laminations 98. The main body portion of shim 90 is preferably formed of a solid metal material and laminations 98 are formed of suitable metallic materials adhesively secured together on surface 97 of the main body portion of the shim. When shims 90 and 91 are installed in the tooth assembly shown in FIG. 7, the curved rear walls 95 are adapted to engage the rear walls of tooth openings 86 and 87 and the foremost of laminations 98 engage the end portions of locking pin retainer 89. When shims 90 and 91 are installed in the assembly shown in FIG. 7 and the operator is unable to sufficiently drive locking pin 92 down through the opening between the locking pin retainer and the tooth shank, the pin assembly may be disassembled, the shims may be removed and stripped of a number of laminations to decrease the thickness of the shims and the pin assembly can then be reassembled in the manner as previously described. In the event that the locking pin still cannot be driven down to the position as illustrated in FIG. 7, the aforementioned procedure can be repeated to fit the locking pin into position as shown. As in the instance of the shim constructions shown in FIGS. 9 through 11, it is contemplated that for a normal application of a tooth assembly for the bucket of a ten cubic yard mining shovel, the laminations can be formed with 0.09 thicknesses so that shim blocks 90 and 91 can be made to vary in thickness between about 1.64 inches to 2.45 inches. In addition to the removal of laminations from shim blocks 90 and 91, if too many laminations are removed so as to result in a loose fit of the locking pin, the pin assembly may be disassembled and additional laminations may be adhesively secured to the shim blocks to increase the thicknesses of the shim blocks and accordingly provide a tight fit for the locking pin.

The shim laminations are secured together by a low to medium strength, pressure-sensitive adhesive so that the laminations can be pried apart or pressed together until the desired shim thickness is achieved.

In either of the embodiments of the invention described, whether either of the shim block constructions are used, it will be appreciated that a locking pin of minimum length can be used to retain the tooth shank on the tooth base or the tooth on the tooth shank because of the hole dimension adjustment feature provided by the use of shim blocks of variable thicknesses. The invention eliminates the additional expense and time involved in the use of a much longer tapered locking pin which must be inserted and then cut off, usually by burning with flame cutting equipment. Under normal applications, the procedure of disassembling the retainer assembly and changing the thicknesses of the shim blocks would be repeated until the upper end of the locking pin would be within approximately one half inch of the upper end of the tooth shank in assemblies wherein a tooth shank is mounted on a tooth base and within one half of an inch of the upper edge of the tooth in assemblies where the tooth is mounted directly on the tooth shank.

The tooth assembly shown in FIG. 15 generally consists of a tooth shank 100 mountable on the forwardly projecting portion of a tooth base 101 and secured thereto by a retainer pin assembly 102, and a tooth point 103 mounted on the front of the tooth shank by means of a connecting pin 104. Tooth shank 101 includes a pair of side walls, a pair of converging upper and lower walls 105 and 106 and a rear end wall 107. The rear wall of the tooth shank is provided with a socket 108 for receiving the forwardly projecting portion of a tooth base 101 when the tooth shank is mounted on the tooth base having upper and lower converging walls 109 and 110 of the tooth base engaging converging walls 111 and 112 of socket 108. The tooth shank further is provided with a set of aligned openings 113 and 114 which which are adapted to register with a pin receiving opening 115 in the forwardly projecting portion of the tooth base. Each of openings 113 and 114 has a greater longitudinal dimension than the longitudinal dimension of the pin receiving opening 115. Opening 113 is provided with a pair of side walls spaced apart approximately the same distance as the space between the side walls of pin receiving opening 115, and curved front and rear end walls. Similarly, aligned opening 114 is provided with a pair of side walls and curved front and rear walls.

Retaining pin assembly 102 consists of a locking pin retainer 116, a set of shims 117 and 118 and a locking pin 119. Locking pin retainer 116 includes an intermediate body portion 120 and flanged end portions 121 and 122. The intermediate portion of pin retainer 116 is provided with a locking pin engaging surface 123 having a plurality of transversely disposed, longitudinally spaced ribs. The opposite surface of the pin retainer is provided with a resilient pad 124 disposed between flanged end portions 121 and 122.

Shims 117 and 118 are substantially square in shape having rounded edges and corners to facilitate installation and removal, although such shims may be of other suitable shapes. The shims are formed of any suitable metal having sufficient strength to effectively transmit loads between the tooth shank and the tooth base through the pin assembly.

Locking pin 119 is tapered along its length and is provided with a curved rear surface 125 engageable with the curved rear walls of aligned openings 113 and 114 of the tooth shank, and a front surface 126 engageable with rear surface 123 of pin retainer 116, having serrations for receiving the rib portions of the pin retainer when the pin assembly is fully assembled.

In the assembly of the tooth assembly shown in FIG. 15, the tooth shank with the tooth point attached is first mounted on the tooth base so that the tooth base is received within socket 108 and aligned openings 113 and 114 register with pin receiving opening 115. The locking pin retainer is then inserted in the registered openings and positioned so that resilient pad 124 is disposed adjacent the front wall of pin receiving opening 115. The upper and lower ends of the locking pin retainer are then tilted rearwardly to permit the insertion of shim blocks 117 and 118. When the shim blocks are in position and the locking pin retainer is moved forwardly so that shim blocks 117 and 118 and resilient pad 124 engage the front surface of opening 115, the tapered locking pin is inserted through openings 113, 115 and 114 and driven with a hammer so that the locking pin engages the locking pin retainer and the tooth shank in wedging relation. After the locking pin has been driven into position, longitudinal displacement of the pin is restrained by the interlocking of the ribs on the rear surface of the locking pin retainer with the serrations formed on the front surface of the locking pin. To disassemble the pin assembly for removing the tooth shank, the locking pin is merely driven in the opposite direction to remove the pin, and thus release the locking pin retainer and shim blocks.

Although the embodiment shown in FIG. 15 includes the combination of a tooth shank and tooth point mounted on a tooth base, it is contemplated that the embodiment would include the modification consisting of a tooth point mounted directly on a tooth base. Such modification would involve simply forming the tooth shank and tooth point as an integral unit.

From the foregoing detailed description, it will be evident that there are a number of changes, adaptations and modifications of the present invention which fall within the province of those persons having ordinary skill in the art to which the aforementioned invention pertains. However, it is intended that all such variations not departing from the spirit of the invention be considered as within the scope thereof as limited soley by the appended claims.

We claim:

1. A tooth assembly for a working implement having a tooth shank provided with an opening therethrough comprising a tooth member mountable on said tooth shank, said tooth member having a socket for receiving said tooth shank therein and a pair of aligned openings registerable with said tooth shank opening when said tooth member is mounted on said tooth shank, and a pin assembly receivable in said registered openings in said tooth shank and tooth member when said tooth member is mounted on said tooth shank, said pin assembly including a locking pin retainer insertable in said aligned openings, having a resilient pad engaging said tooth shank when said tooth member is mounted on said tooth shank, shims disposable between said tooth member and said locking pin retainer when said tooth member is mounted on said tooth shank and said locking pin retainer is inserted in said aligned openings, and a locking pin insertable in said aligned openings when said tooth member is mounted on said tooth shank, said locking pin retainer is inserted in said aligned openings and said shims are disposed between said tooth member and said locking pin retainer, engaging said locking pin retainer and tooth shank in wedging relation to urge said tooth member in positive engagement with said tooth shank.

2. A tooth assembly according to claim 1 wherein said locking pin retainer includes a pair of flanges and said shims are disposable between said flanges and said tooth shank whereby said shims are prevented from moving outwardly relative to said tooth shank.

3. A tooth assembly according to claim 1 wherein said locking pin retainer and said locking pin are provided with interlocking surfaces.

4. A tooth assembly according to claim 3 wherein said interlocking surfaces comprise a serrated surface on one of said locking pin retainer and said locking pin and a surface having a set of protrusions on the other of said locking pin retainer and said locking pin cooperable with the serrations of the serrated surface of the other of said locking pin retainer and said locking pin to restrain longitudinal displacement between said locking pin retainer and said locking pin.

5. A tooth assembly accordingly to claim 1 including a plurality of sets of shims, each set of shims having a different thickness, which may be utilized selectively for maintaining the opening into which the locking pin is inserted within a predetermined dimensional range.

6. A tooth assembly according to claim 1 wherein said shims include means for varying the thicknesses thereof.

7. A tooth assembly according to claim 1 wherein each of said shims includes at least one lamination which may be removed to vary the thickness thereof and correspondingly the spacing between said tooth member and said locking pin retainer for maintaining the opening into which the locking pin is inserted within a predetermined dimensional range.

8. A tooth assembly for a working implement having a tooth base provided with an opening therethrough comprising a tooth shank mountable on said tooth base, said tooth shank having a socket for receiving said tooth base therein and a pair of aligned openings registerable with said tooth base opening when said tooth shank is mounted on said tooth base, a tooth point mountable on said tooth shank, and a pin assembly receivable in said registered openings in said tooth base and tooth shank when said tooth shank is mounted on said tooth base, said pin assembly including a locking pin retainer insertable in said aligned openings, having a resilient pad engaging said tooth base when said tooth shank is mounted on said tooth base, shims disposable between said tooth shank and said locking pin retainer when said tooth shank is mounted on said tooth base and said locking pin retainer is inserted in said aligned openings, and a locking pin insertable in said aligned openings when said tooth shank is mounted on said tooth base, said locking pin retainer is inserted in said aligned openings and said shims are disposed between said tooth shank and said locking pin retainer, engaging said locking pin retainer and said tooth base in wedging relation to urge said tooth shank in positive engagement with said tooth base.

9. A tooth assembly according to claim 8 wherein said locking pin retainer includes a pair of flanges and said shims are disposed between said flanges and said tooth base whereby said shims are prevented from moving upwardly relative to said tooth base.

10. A tooth assembly according to claim 8 wherein said locking pin retainer and said locking pin are provided with interlocking surfaces.

11. A tooth assembly according to claim 10 wherein said interlocking surfaces comprise a serrated surface on one of said locking pin retainer and said locking pin and a surface having a set of protrusions on the other of said locking pin retainer and said locking pin cooperable with the serrations of the serrated surface of the other of said locking pin retainer and locking pin to restrain longitudinal displacement between said locking pin retainer and said locking pin.

12. A tooth assembly according to claim 8 including a plurality of sets of shims, each set of shims having a different thickness, which may be utilized selectively for maintaining the opening into which the locking pin is inserted within a predetermined dimensional range.

13. A tooth assembly according to claim 8 wherein said shims include means for varying the thicknesses thereof.

14. A tooth assembly according to claim 8 wherein each of said shims includes at least one lamination which may be removed to vary the thickness thereof and correspondingly the spacing between said tooth shank and said locking pin retainer for maintaining the opening into which the locking pin is inserted within a predetermined dimensional range.

15. A retainer pin assembly for a working implement having a tooth support member provided with a protruding portion having an opening therethrough and a tooth mounted on said support member having a socket receiving the protruding portion of said support member therein and a pair of aligned openings registered with said support member opening, comprising a locking pin retainer disposable in said registered openings, having a resilient pad engageable with said support member when said locking pin retainer is disposed in said registered openings, shims disposable between said locking retainer and said tooth when said tooth is mounted on said support member and said locking pin retainer is disposed in said registered openings, and a locking pin insertable in said registered openings when said tooth is mounted on said support member, said locking pin retainer is disposed in said registered openings and said shims are disposed between said tooth and said locking pin retainer, for engaging said locking pin retainer and support member in wedging relation to urge said tooth into positive engagement with said support member.

16. A retainer pin assembly according to claim 15 wherein said locking pin retainer includes a pair of flanges and said shims are disposable between said flanges and said support member whereby said shims are prevented from moving outwardly relative to said support member.

17. A retainer pin assembly according to claim 15 wherein said locking pin retainer and said locking pin are provided with interlocking surfaces.

18. A retainer pin assembly according to claim 17 wherein said interlocking surfaces comprise a serrated surface on one of said locking pin retainer and said locking pin and a surface having a set of protrusions on the other of said locking pin retainer and locking pin cooperable with the serrations of the serrated surface of the other of said locking pin retainer and locking pin to restrain longitudinal displacement between said locking pin retainer and said locking pin.

19. A retainer pin assembly according to claim 15 including a plurality of sets of shims, each set of shims having a different thickness, which may be utilized selectively for maintaining the opening into which the locking pin is inserted within a predetermined dimensional range.

20. A retainer pin assembly according to claim 15 wherein said shims include means for varying the thicknesses thereof.

21. A retainer pin assembly according to claim 15 wherein each of said shims includes at least one lamination which may be removed to vary the thickness thereof and correspondingly the spacing between said tooth member and said locking pin retainer for maintaining the opening into which the locking pin is inserted within a predetermined dimensional range.

22. A retainer pin assembly according to claim 15 wherein each of said shims has a set of different thicknesses whereby said shims may be reoriented to vary the spacing between said tooth and said locking pin retainer and correspondingly the spacing between said locking pin retainer and said support member.

23. A shim disposable between the tooth member and the locking pin retainer of a working implement having a tooth support member provided with a protruding portion having an opening therethrough, a tooth member provided with a socket for receiving the protruding portion of said tooth support member therein and a pair of aligned openings registered with said opening in said protruding portions and a locking pin inserted in said registered openings and engaging said locking pin retainer and said tooth support member in wedging relation, comprising member having a main body portion disposable between said tooth member and said locking pin retainer and engagable with one of said tooth member and said locking pin retainer and at least one lamination detachably mounted on said main body portion and engagable with the other of said tooth member and said locking pin retainer.

24. A shim according to claim 23 wherein said lamination is adhesively secured to said main body portion.

25. A shim according to claim 23 wherein said main body portion and said lamination are formed of a metal and said lamination is adhesively secured to said main body portion with a low to medium strength, pressuresensitive adhesive.

26. A method of securing a tooth on a tooth support member on which the support member is provided with a protruding portion having an opening therethrough and said tooth is provided with a socket receiving the protruding portion of said support member and a pair of aligned openings registered with said support member opening, comprising inserting a locking pin retainer in said aligned openings, positioning a set of shims between said tooth and said locking pin retainer, inserting a tapered pin in said aligned openings, between said locking pin retainer and said support member and then driving said tapered pin into said aligned openings to wedge said tapered pin between said locking pin retainer and said support member.

27. A method according to claim 26 including repeating said method, utilizing shims of different thicknesses until the tooth is tightly secured to said support member.

28. A tooth assembly for a working implement having a tooth base provided with an opening therethrough comprising a tooth shank mountable on said tooth base, said tooth shank having a socket for receiving said tooth base therein and a pair of aligned openings registerable with said tooth base opening when said tooth shank is mounted on said tooth base, a tooth point mountable on said tooth shank, and a pin assembly receivable in said registered openings in said tooth base and tooth shank when said tooth shank is mounted on said tooth base, said pin assembly including a locking pin retainer insertable in said aligned openings, having a resilient pad engaging said tooth base when said tooth shank is mounted on said tooth base, shims disposable between said tooth base and said locking pin retainer when said tooth shank is mounted on said tooth base and said locking pin retainer is inserted in said aligned openings, and a locking pin insertable in said aligned openings when said tooth shank is mounted on said tooth base, said locking pin retainer is inserted in said aligned openings and said shims are disposed between said tooth base and said locking pin retainer, engaging said locking pin retainer and said tooth shank in wedging relation to urge said tooth shank in positive engagement with said tooth base.

29. A tooth assembly according to claim 28 wherein said locking pin retainer includes a pair of flange portions and said shims are disposed between said flanges whereby said shims are prevented from moving longitudinally relative to said locking pin retainer.

30. A tooth assembly according to claim 28 wherein said locking pin retainer and said locking pin are provided with interlocking surfaces.

31. A tooth assembly for a working implement having a tooth base provided with an opening therethrough comprising a tooth member mountable on said tooth base, said tooth member having a socket for receiving said tooth base therein and a pair of aligned openings registerable with said tooth base opening when said tooth member is mounted on said tooth base, and a pin assembly receivable in said registered openings in said tooth base and said tooth member when said tooth member is mounted on said tooth base, said pin assembly including a locking pin retainer insertable in said aligned openings, having a resilient pad engaging said tooth base when said tooth member is mounted on said tooth base, shims disposable between said tooth base and said locking pin retainer when said tooth member is mounted on said tooth base and said locking pin retainer is inserted in said aligned openings, and a locking pin insertable in said aligned openings when said tooth member is mounted on said tooth base, said locking pin retainer is inserted in said aligned openings and said shims are disposed between said tooth base and said locking pin retainer, engaging said locking pin retainer and said tooth member in wedging relation to urge said tooth member in positive engagement with said tooth base.

32. A tooth assembly according to claim 31 wherein said locking pin retainer includes a pair of flanges and said shims are disposable between said flanges whereby said flanges are prevented from moving longitudinally relative to said locking pin retainer.

33. A tooth assembly according to claim 31 wherein said locking pin retainer and said locking pin are provided with interlocking surfaces.

* * * * *